United States Patent Office.

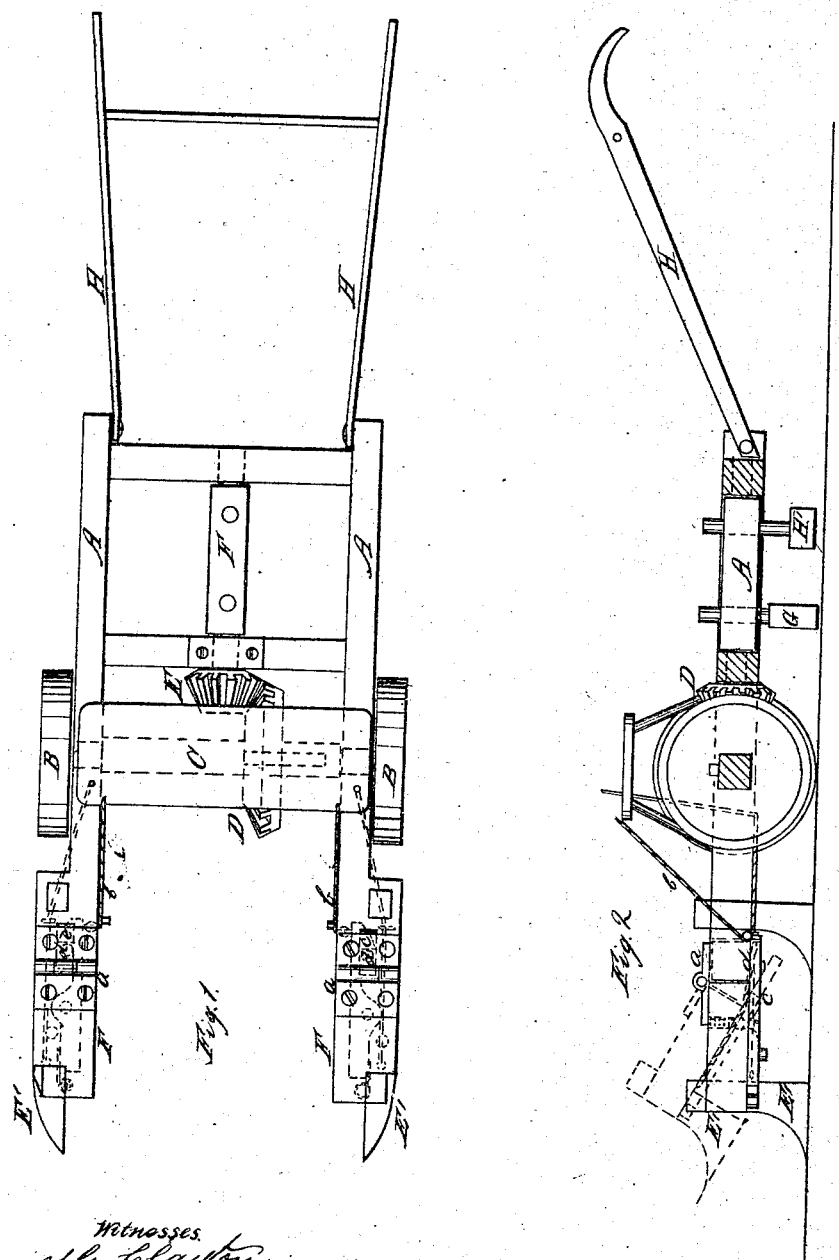

L. HENDERSON, OF MANSON, NORTH CAROLINA.

Letters Patent No. 78,088, dated May 19, 1868; antedated May 12, 1868.

---

IMPROVEMENT IN COTTON-CULTIVATOR.

---

*The Schedule referred to in these Letters Patent and making part of the same.*

---

TO ALL WHOM IT MAY CONCERN:

Be it known that I, L. HENDERSON, of Manson, in the county of Warren, and in the State of North Carolina, have invented certain new and useful Improvements in "Cotton-Cultivators;" and I do hereby declare that the following is a full, clear, and exact description thereof, reference being had to the accompanying drawings, and to the letters of reference marked thereon, in which—

Figure 1 is a plan view, and

Figure 2 is a side elevation.

The nature of my invention consists in the manner of arranging the adjustable ploughshares, in combination with the driving-wheels and bevel-gear wheels for operating the hoes or thinners, and the manner of adjusting the same, as hereinafter more fully described.

To enable others skilled in the art to make and use my invention, I will proceed to describe its construction and operation In the construction of my invention, in fig. 1, is the framework or foundation of the machine, which is made of bars of wood, in size to suit, and of any adapted shape required, and which is placed on driving-wheels having an axle passing through the frame, and on which is placed a bevel-gear wheel, which operates on a spur-gear wheel on the end of a shaft into which are firmly set the hoes, and which shaft has its bearings in the cross-pieces of the frame.

To designate the parts in fig. 1, A A A A is the frame; B B, the driving-wheels; C, the axle; D, the driving-gear wheel; E, the spur-gear wheel; F, the shaft to which it is attached; G and H', the hoes or thinners. At the one end of this frame are two ploughs E' E', or shares, placed parallel to each other, and the portion of the frame to which they are attached is hinged to the main part of the beam by hinges *a a*, to allow the ploughs when not operating to be turned up out of the way, so that the machine can be moved over the field without the ploughs operating, and when it is desired to place the ploughs in position to act on the soil, the operator or driver, who may be on a seat placed on and above the frame, or at the handles of the machine, pulls the straps *b b*, which are attached to the portion of the frame to which the ploughs are attached, drawing them down so as to enter the soil, when the springs *c c* catch on pins *d d*, and firmly hold them in place, and cause them to do their work. The catch-springs *c c* are also held in position by springs *e e* let into the frame A, or by any other form of convenient spring. When the ploughs are to be raised and turned up, so as not to operate, I simply detach the springs *c c*, and turn the ends of the beams up, which lifts the ploughs with them out of the way of operating. Springs *f f* assist in so doing. H H are the handles of the plough.

The hoes may be made of any suitable form and size I may choose to make them for the purpose intended. I may so construct my machine for light purposes of cultivation that I may use but one driving-wheel and handles without the seat; also, so construct the same that both the ploughs and the cutters may be thrown out of gear when required.

In the operation of my invention, having constructed it as set forth, the wheels are about twelve inches apart, and the ploughs about the same; thus leaving between the ploughs, when properly regulated, a streak of ground or row of cotton, from three to twelve inches in width, undisturbed by the ploughs.

When power is applied to the machine, and it is put to use as a cotton-cultivator, the machine is made to straddle the row of cotton, running the share as near to the row of cotton on each side as is practicable to do, the driving-wheels may be made to run in the track of the ploughs or otherwise, if found more convenient. Motion is given to the hoes by means of the cog-gear wheels, causing the same to revolve, and at each revolution cutting out of the row of cotton the width of each hoe, leaving one, two, or three stocks of cotton, thus bringing the row to the proper stand which is desired to let it remain for future cultivation.

The hoes may be made of any convenient shape, and set at the distances apart required.

When a seat is used, the driver being seated on it will be able to drive the team, and guide and control the machine, and when he may wish to raise the ploughs, so that they can not operate on the soil, he detaches the spring-catch from the pin and turns up the joint-end of the frame and plough resting back on the main frame, and when he desires to use the ploughs he can do so by operating the straps or chains, which will throw the ploughs down into position, when the spring-catch will firmly hold against the pins, and hold the ploughs firmly to their work.

The gearing can be thrown out when desired, and the hoes will not operate.

Having thus fully described the construction and operation of my invention, what I claim as new, and desire to secure by Letters Patent, is—

The adjustable hinged ploughs E' E', in combination with the gear-wheels D and E, shaft F, and hoes G and H, constructed substantially as described, and operating as and for the purposes set forth.

In testimony that I claim the above-described improvements, I have hereunto signed my name, this 7th day of August, 1867.

L. HENDERSON.

Witnesses:
WM. WALLACE WHITE,
JO. C. CLAYTON.